(12) United States Patent
Chaumonnot et al.

(10) Patent No.: US 8,568,882 B2
(45) Date of Patent: Oct. 29, 2013

(54) MESOSTRUCTURED MATERIAL HAVING A HIGH ALUMINIUM CONTENT AND CONSISTING OF SPHERICAL PARTICLES OF SPECIFIC SIZE

(75) Inventors: Alexandra Chaumonnot, Lyons (FR); Aurelie Coupe, Noisiel (FR); Clement Sanchez, Gif-sur-Yvette (FR); Cedric Boissiere, Paris (FR); Michel Martin, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 262 days.

(21) Appl. No.: 12/935,334

(22) PCT Filed: Feb. 26, 2009

(86) PCT No.: PCT/FR2009/000210
§ 371 (c)(1),
(2), (4) Date: Dec. 21, 2010

(87) PCT Pub. No.: WO2009/122023
PCT Pub. Date: Oct. 8, 2009

(65) Prior Publication Data
US 2011/0111232 A1 May 12, 2011

(30) Foreign Application Priority Data

Mar. 31, 2008 (FR) ...................................... 08 01764

(51) Int. Cl.
*B32B 1/00* (2006.01)
*B29B 9/16* (2006.01)
*B01J 29/06* (2006.01)

(52) U.S. Cl.
USPC .............. 428/404; 428/403; 502/60; 502/63; 502/64; 502/69

(58) Field of Classification Search
None
See application file for complete search history.

(56) References Cited

U.S. PATENT DOCUMENTS

| 7,101,523 B2 * | 9/2006 | Mori et al. ..................... 423/338 |
| 7,807,598 B2 * | 10/2010 | Euzen et al. ..................... 502/71 |
| 2006/0292054 A1 * | 12/2006 | Chaumonnot et al. ...... 423/328.1 |
| 2009/0029847 A1 | 1/2009 | Euzen et al. |

FOREIGN PATENT DOCUMENTS

WO  WO 2006/128989 A1  12/2006

OTHER PUBLICATIONS

International Search Report of PCT/FR2009/000210 (Sep. 25, 2009).
A. Karlsson et al., "Composites of Micro- and Mesoporous Materials: Simultaneous Syntheses of MFI/MCM-41 Like Phases by a Mixed Template Approach," Microporous and Mesoporous Materials, vol. 27, No. 2-3 (1999) pp. 181-192.

* cited by examiner

*Primary Examiner* — Monique Jackson
(74) *Attorney, Agent, or Firm* — Millen, White, Zelano & Branigan, P.C.

(57) ABSTRACT

A mesostructured material is described, which consists of at least two elementary spherical particles, each one of said particles comprising a mesostructured matrix based on aluminium oxide, said matrix having a pore diameter ranging between 1.5 and 30 nm, and an aluminium oxide content representing more than 46 wt. % of the mass of said matrix, which has amorphous walls of thickness ranging between 1 and 30 nm, said elementary spherical particles having a diameter D greater than 10 μm and less than or equal to 100 μm (10<D(μm)≤100). Said mesostructured matrix can also contain silicon oxide. Each spherical particle of the mesostructured material can also contain zeolite nanocrystals so as to form a mixed porosity material of both mesostructured and zeolitic nature. The preparation of said material is also described.

13 Claims, No Drawings

MESOSTRUCTURED MATERIAL HAVING A HIGH ALUMINIUM CONTENT AND CONSISTING OF SPHERICAL PARTICLES OF SPECIFIC SIZE

FIELD OF THE INVENTION

The present invention relates to the field of mesostructured materials based on aluminium oxide. It also relates to the field of mesostructured materials having a high aluminium content of hierarchical or mixed porosity in the microporosity and mesoporosity domain. It also relates to the preparation of these materials that are obtained using the EISA (Evaporation Induced by Self-Assembly) method. Thanks to their structural and textural properties, and to their acido-basic properties, the materials according to the invention are particularly well suited for applications in the sphere of refining and petrochemistry.

BACKGROUND OF THE INVENTION

New synthesis strategies allowing to obtain materials of well defined porosity in a very wide range, from microporous materials to macroporous materials to hierarchical porosity materials, i.e., having pores of several sizes, have known a very large development within the scientific community since the mid-90s (G. J. de A. A. Soler Illia, C. Sanchez, B. Lebeau, J. Patarin, *Chem Rev.*, 2002, 102, 4093. Materials whose pore size is controlled are obtained. In particular the development of synthesis methods referred to as "soft chemistry" has led to the elaboration of mesostructured materials at low temperature through the co-existence, in aqueous solution or in solvents of marked polarity, of inorganic precursors with structuring agents, generally molecular or supramolecular surfactants, ionic or neutral. Control of electrostatic interactions or through hydrogen bonds between the inorganic precursors and the structuring agent jointly linked with hydrolysis condensation reactions of the inorganic precursor leads to a cooperative assembly of the organic and inorganic phases generating micelle aggregates of surfactants of uniform and controlled size within an inorganic matrix. This cooperative self assembly phenomenon governed, among other things, by the structuring agent concentration, can be induced by progressive evaporation of a solution of reactants whose structuring agent concentration is lower than the critical micelle concentration, which leads to either the formation of mesostructured films in the case of a deposition on substrate dip coating technique or to the formation of a mesostructured powder after atomization (aerosol technique) or draining of the solution. By way of example, patent U.S. Pat. No. 6,387,453 discloses the formation of mesostructured organic inorganic hybrid films by means of the dip coating technique, and these authors have furthermore used the aerosol technique to elaborate mesostructured purely silicic materials (C. J. Brinker, Y. Lu, A. Sellinger, H. Fan, *Adv Mat* 1999, 11, 7). Clearance of the porosity is then obtained by surfactant elimination, which is conventionally carried out by means of chemical extraction processes or by thermal treatment. Depending on the nature of the inorganic precursors and of the structuring agent used, and on the operating conditions applied, several families of mesostructured materials have been developed. For example the M41S family initially developed by Mobil (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, *J. Am. Chem. Soc.* 1992, 114, 27, 10834), consisting of mesoporous materials obtained using ionic surfactants such as quaternary ammonium salts, having a generally hexagonal, cubic or lamellar structure pores of uniform diameter ranging from 1.5 to 10 nm and amorphous walls of thickness of the order of 1 to 2 nm, has been widely studied. Later, in order to increase the hydrothermal stability properties while developing acido basicity properties relative to these materials, the incorporation of the element aluminium in the amorphous silicic framework by direct synthesis or post synthesis processes has been particularly studied, the aluminosilicate materials obtained having a Si/Al molar ratio ranging between 1 and 1000 (S. Kawi, S. C. Shen, *Stud. Surf. Sci. Catal.* 2000,129, 227; S. Kawi, S. C. Shen, *Stud. Surf. Sci. Catal.* 2000,129, 219; R. Mokaya, W. Jones, *Chem. Commun.*, 1997, 2185). The hydrothermal stability and acido basicity properties thus developed by these aluminosilicates have however not allowed them to be used on an industrial stage in refining or petrochemistry processes, which has progressively led to the use of new structuring agents such as amphiphilic macromolecules of block copolymer type, the latter leading to mesostructured materials having a generally hexagonal, cubic or lamellar structure pores of uniform diameter ranging from 4 to 50 nm and amorphous walls of thickness ranging from 3 to 7 nm. Depending on the structure and on the organization degree required for the final mesostructured material, these syntheses can take place in an acidic medium (pH≤1) (WO-99/37,705) or in a neutral medium (WO-96/39,357), the nature of the structuring agent used also playing an essential part. The mesostructured aluminosilicate materials thus obtained exhibit increased hydrothermal stability properties in relation to their homologs synthesized via other structuring agents, their acido-basicity properties remaining more or less similar (1<Si/Al<1000). Low Si/Al molar ratio values such as Si/Al<20 are however difficult to obtain because large amounts of aluminium are not readily incorporated in the material via these particular operating methods (D. Zaho, J. Feng, Q. Huo, N. Melosh, G. H. Fredrickson, B. F. Chmelke, G. D. Stucky, *Science*, 1998, 279, 548; Y.-H. Yue, A. Gédéon, J.-L. Bonardet, J. B. d'Espinose, N. Melosh, J. Fraissard, *Stud. Surf. Sci. Catal.*, 2000,129, 209).

Considerable work has furthermore been done in order to elaborate aluminosilicate materials having both the advantages of an organized mesoporous structure and of a microcrystalline network. Several synthesis techniques allowing elaboration of mixed or composite mesostructured zeolite materials have thus been recorded in the open literature. A first synthesis technique consists in synthesizing in a first stage a mesostructured aluminosilicate material according to the conventional methods mentioned above then in a second stage, in impregnating this material with a structuring agent commonly used for the synthesis of zeolite materials. A suitable hydrothermal treatment leads to a zeolitization of the amorphous walls of the initial mesostructured aluminosilicate (U.S. Pat. No. 6,669,924). A second synthesis technique consists in bringing together a colloidal solution of zeolite seeds with a structuring agent commonly used to create a mesostructuration of the final material. The elaboration of an inorganic matrix of organized mesoporosity and the growth within this matrix, of the zeolite seeds, so as to obtain a mesostructured aluminosilicate material having crystallized walls, are simultaneous (Z. Zhang, Y. Han, F. Xiao, S. Qiu, L. Zhu, R. Wang, Y. Yu, Z. Zhang, B. Zou, Y. Wang, H. Sun, D. Zhao, Y. Wei, *J. Am. Chem. Soc.*, 2001, 123, 5014; Y. Liu, W. Zhang, T. J. Pinnavaia, *J. Am. Chem., Soc.*, 2000, 122, 8791). A variant of these two techniques initially consists in preparing a mixture of aluminium and silicon precursors in the presence of two structuring agents, one likely to generate a zeolitic system and the other likely to generate a mesostructuration. This solution is then subjected to two crystallization stages under variable hydrothermal treatment conditions, a first stage leading to the formation of the mesoporous structure of organized porosity and a second stage leading to the zeolitization of the amorphous walls (A. Karisson, M. Stöcker, R. Schmidt, *Micropor. Mesopor. Mater.*, 1999, 27181). All these synthesis methods have the drawback of damaging the mesoporous structure and therefore of losing the advantages thereof in cases where the growth of the zeolite seeds or the zeolitization of the walls is not perfectly controlled, which makes these techniques delicate to implement. It is possible to avoid this phenomenon by elaborating directly mesostructured zeolite composite materials. This can be done by subjecting to a thermal treatment a mixture of a solution of zeolite seeds and of a solution of mesostructured aluminosilicate seeds (A. Karisson, M. Stocker, R. Schmidt, *Micropor. Mesopor. Mater.*, 1999, 27, 181), or through the growth of a zeolite layer at the surface of a pre-synthesized mesostructured aluminosilicate (D. T. On, S. Kaliaguine, *Angew. Chem. Int. Ed.*, 2002, 41, 1036). From an experimental point of view, unlike the techniques involving the EISA method described above, the aluminosilicate materials of hierarchical porosity thus defined are not obtained through progressive concentration of the inorganic precursors and of the structuring agent(s) within the solution where they are present, they are conventionally obtained by direct precipitation within an aqueous solution or in polar solvents by using the value of the critical micelle concentration of the structuring agent. Furthermore, synthesis of these materials obtained by precipitation requires a ripening stage in an autoclave and all the reactants are not integrated in the products in stoichiometric proportion since they can be found in the supernatent. The elementary particles usually obtained have no regular shape and they are generally characterized by a size generally ranging between 200 and 500 nm, sometimes more

SUMMARY OF THE INVENTION

The invention relates to a mesostructured material consisting of at least two elementary spherical particles, each one of said spherical particles comprising a mesostructured matrix based on aluminium oxide, said matrix having a pore diameter ranging between 1.5 and 30 nm, and an aluminium oxide content representing more than 46 wt % of the mass of said matrix, which has amorphous walls of thickness ranging between 1 and 30 nm, said elementary spherical particles having a diameter D such that $10<D\ (\mu m) \leq 100$. Said mesostructured matrix based on aluminium oxide preferably comprises silicon oxide in such a proportion that the Si/Al molar ratio of said matrix is strictly below 1.

Each one of said elementary spherical particles can also comprise zeolite nanocrystals having a pore opening ranging between 0.2 and 2 nm, so that said material according to the invention has a mixed porosity of both mesostructured and zeolitic nature.

The present invention also relates to the preparation of the material according to the invention. A method of preparing the material according to the invention, referred to as "main preparation method according to the invention", comprises a) mixing into a solution at least one surfactant, at least one aluminic precursor and optionally at least one silicic precursor; b) aerosol atomizing the solution obtained in stage a) using a spray nozzle that leads to the formation of liquid droplets of diameter less than or equal to 300 µm; c) drying said droplets; d) crushing the solid product obtained in stage c); e) mixing into a solution at least one surfactant, at least one aluminic precursor, optionally at least one silicic precursor and at least a fraction of the solid product obtained in stage d) so as to form a suspension; f) aerosol atomizing the suspension obtained in stage e) using a spray nozzle that leads to the formation of suspension droplets, which are precursors of the constituent spherical elementary particles of diameter D such that $10<(\mu m) \leq 100$ of the material according to the invention; g) drying said droplets obtained in stage f); and h) removing said surfactant introduced in said stages a) and e) so as to obtain a mesostructured porosity material. Said method is referred to as "main preparation method according to the invention" in the rest of the description.

Preparation of a mesostructured/zeolitic mixed material involves for example a prior stage $a_0$) consisting in synthesizing, in the presence of at least one structuring agent, zeolite nanocrystals of maximum nanometric size equal to 1000 nm in order to obtain a colloidal solution in which said nanocrystals are dispersed, or it is possible to introduce into the mixture according to stages a) and e) described above zeolite crystals, which have the specific feature of dispersing in form of nanocrystals of maximum nanometric size equal to 1000 nm in solution. The ordered structure of the matrix of each spherical particle making up the material according to the invention is due to the micellization or self assembly phenomenon induced by the EISA method.

RELEVANCE OF THE INVENTION

The mesostructured material according to the invention is a material consisting of elementary spherical particles, each one of said particles comprising a mesostructured matrix having a high aluminium content. Said mesostructured matrix can also contain silicon oxide which in this case confers interesting acido-basicity properties on the material according to the invention. The present invention also provides a material of mixed porosity wherein zeolite nanocrystals are trapped in the mesostructured matrix such a material being advantageous because it simultaneously has the structural, textural and acido-basicity properties specific to the materials of the zeolite family and to the materials based on aluminium oxide, more particularly the mesostructured aluminosilicate materials. The ordered structure of the material according to the invention due to the micellization or self-assembly phenomenon induced by the EISA method allows to readily elaborate mesostructured materials, in the presence or not of zeolite nanocrystals, without damaging the nature of the mesostructured phase or that of the zeolite phase possibly present, and to work with a wide range of zeolite nanocrystals whatever their initial synthesis methods. In fact, a material of mixed mesostructured/zeolitic porosity can be prepared using zeolite crystals of size well above 1000 nm, provided that they have the property of dispersing in solution, notably an acidic solution, more preferably an acidic aquo-organic solution, in form of nanocrystals of maximum nanometric size equal to 1000 nm. Furthermore, the elaboration, on the "submicronic" scale, of a mesostructured/zeolitic material leads to a privileged connection of the microporous and mesoporous zones within a single spherical particle.

Moreover, the mesostructured material according to the invention, in the presence or not of zeolite nanocrystals, consists of spherical elementary particles. Said particles have a diameter D such that $10<D\ (\mu m) \leq 100$, and D preferably ranges between 11 and 70 µm. The controllable size of these particles resulting from the implementation and the control of the EISA method by the applicant as well as their perfectly spherical shape, allow better control of the diffusion of the compounds when using the material according to the invention as a catalyst or an adsorbent for applications in the field of refining and petrochemistry, by comparison with materials known in the state of the art, which come in form of elementary particles of non-homogenous, i.e., irregular, shape.

Furthermore, in relation to known mesostructured material syntheses, preparation of the material according to the invention is performed on a continuous basis, the preparation time is reduced (some hours, as opposed to 12 to 24 hours when using autoclaving) and the stoichiometry of the non volatile species present in the initial reactant solution is maintained in the material of the invention.

DETAILED DESCRIPTION

The object of the present invention is a mesostructured material consisting of at least two elementary spherical particles each one of said spherical particles comprising a mesostructured matrix based on aluminium oxide, said matrix having a pore diameter ranging between 1.5 and 30 nm, and an aluminium oxide content representing more than 46 wt. % of the mass of said matrix, which has amorphous walls of thickness ranging between 1 and 30 nm, said elementary spherical particles having a diameter D greater than 10 μm and less than or equal to 100 μm (10<D (μm)≤100).

What is referred to as mesostructured material in the sense of the present invention is a material having at least an organized porosity on the scale of the mesopores of each one of said spherical particles, i.e., an organized porosity on the scale of the pores of uniform diameter ranging between 1.5 and 30 nm, preferably between 1.5 and 10 nm, homogeneously and evenly distributed in each one of said particles (mesostructuration of the material). More precisely, within the scope of the present invention, the mesostructuration of the material is inherent in the matrix, included in said material the matrix based on aluminium oxide, contained in each one of said spherical particles making up the material according to the invention, is mesostructured. It exhibits mesopores having a uniform diameter ranging between 1.5 and 30 nm, preferably between 1.5 and 10 nm, homogeneously and evenly distributed in each one of said particles. It can be noted that a porosity of microporous nature can also result from the imbrication of the surfactant, used during preparation of the material according to the invention, with the inorganic wall at the level of the organic-inorganic interface developed upon mesostructuration of the inorganic component of said material according to the invention. The matter contained between the mesopores of the mesostructured matrix is amorphous and forms walls whose thickness ranges between 1 and 30 nm. The wall thickness corresponds to the distance between a first mesopore and a second mesopore, the second mesopore being the closest pore to said first mesopore. The organization of the mesoporosity described above leads to a structuration of the matrix based on aluminium oxide that can be hexagonal, vermicular, cholesteric, lamellar, bicontinuous or cubic, preferably vermicular. The material according to the invention also has an interparticular textural macroporosity.

According to the invention, said elementary spherical particles, making up the material according to the invention have a diameter D, expressed in micron, strictly above 10 μm and less than or equal to 100 μm (10<D (μm)≤100. Preferably diameter D of said spherical particles advantageously ranges between 11 and 70 μm. According to a particular embodiment of the material according to the invention, said elementary spherical particles have a diameter D ranging between 11 and 50 μm, more preferably between 15 and 50 μm. More precisely, said elementary spherical particles are present in the material according to the invention in form of aggregates.

The material according to the invention advantageously has a specific surface area ranging between 100 and 1200 m²/g, more advantageously between 200 and 1000 m²/g, and most advantageously between 300 and 800 m²g.

According to a first embodiment of the material of the invention, the mesostructured matrix based on aluminium oxide is entirely aluminic According to a second embodiment of the material of the invention, the mesostructured matrix based on aluminium oxide also comprises silicon oxide. The matrix contained in each spherical particle of the material according to the invention is, in this case, an aluminosilicate. The silicon oxide content in the aluminosilicate matrix is such that the Si/Al molar ratio is strictly below 1.

According to a third embodiment of the material of the invention, each one of said spherical particles also comprises zeolites nanocrystals having a pore opening ranging between 0.2 and 2 nm. The material according to the invention then exhibits, on the scale of said spherical particles, an organized porosity on the mesopore scale of uniform diameter ranging between 1.5 and 30 nm, preferably between 1.5 and 10 nm, homogeneously and evenly distributed in each one of said particles (mesostructuration as described above) as well as a zeolite type microporosity whose characteristics (structural type of the zeolite, chemical composition of the zeolitic network) depend on the zeolite nanocrystals selected. According to the third embodiment of the material of the invention, the zeolite nanocrystals have a pore opening ranging between 0.2 and 2 nm, preferably between 0.2 and 1 nm, and more preferably between 0.2 and 0.6 nm. Said nanocrystals generate the microporosity in each elementary spherical particle making up the material according to the invention. According to this third embodiment of the material of the invention, said matrix can be either entirely aluminic, or also comprise silicon oxide. The material according to the third embodiment is referred to as mesostructured/zeolitic mixed material in the rest of the description.

According to the third embodiment of the mesostructured material of the invention, the zeolite nanocrystals advantageously represent 0.1 to 30 wt. %, preferably 0.1 to 20 wt. % and more preferably 0.1 to 10 wt. % of the material according to the invention. Any zeolite and in particular, but in a non-exhaustive manner, those listed in "*Atlas of zeolite framework types*", 6$^{th}$ revised Edition, 2007, C. Baerlocher, L. B. McCusker, D. H. Olson, can be used in the zeolite nanocrystals present in each elementary spherical particle making up the material according to the invention. The zeolite nanocrystals preferably comprise at least one zeolite selected from among the following zeolites: ZSM-5, ZSM-48, ZSM-22, ZSM-23, ZBM-30, EU-2, EU-11, Silicalite Beta zeolite A, Faujasite, Y, USY, VUSY, SDUSY, Mordenite, NU-87, NU-88, NU-86, NU-85, IM-5, IM-12, Ferrierite and EU-1. More preferably, the zeolite nanocrystals comprise at least one zeolite selected from among the zeolites of MFI, BEA, FAU and LTA structural type. Nanocrystals of different zeolites and notably zeolites of different structural types can be present in each spherical particle making up the material according to the invention. In particular, each spherical particle making up the material according to the invention can advantageously comprise at least first zeolite nanocrystals whose zeolite is selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, Mordenite, NU-87, NU-88, NU-86, NU-85, IM-5, IM-12, Ferrierite and EU-1, preferably from among the zeolites of MFI, BEA, FAU and LTA structural type, and at least second zeolite nanocrystals whose zeolite is different from that of the first zeolite nanocrystals and selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, Mordenite, NU-87, NU-88, NU-86, NU-85, IM-5, IM-12, Ferrierite and EU-1, preferably from among the zeolites of MFI, BEA, FAU and LTA structural type. The zeolite nanocrystals advantageously comprise at least one zeolite either entirely silicic or containing, in addition to silicon, at least one element T selected from among aluminium, iron, boron, indium and gallium, preferably aluminium. The zeolite nanocrystals have a maximum size of 1000 nm, and preferably a size ranging between 30 and 500 nm.

The mesostructured material of the present invention having an entirely aluminic mesostructured matrix or of aluminosilicate nature and having optionally zeolite nanocrystals trapped in this matrix, can be obtained in form of powder, balls, pellets, granules or extrudates, the shaping operations being performed using conventional techniques known to the person skilled in the art. Preferably, the material according to the invention is obtained in form of a powder consisting of elementary spherical particles having a diameter D such that 10<D (µm)≤100, which facilitates the possible compound diffusion if the material according to the invention is used in a potential industrial application.

The object of the present invention is also the preparation of the material according to the invention. It first provides a method of preparing the mesostructured material according to the invention comprising an entirely aluminic mesostructured matrix or of aluminosilicate nature. A method of preparing such a material according to the invention, referred to as "main preparation method according to the invention", comprises a) mixing into a solution at least one surfactant at least one aluminic precursor and optionally at least one silicic precursor; b) aerosol atomizing the solution obtained in stage a) using a spray nozzle that leads to the formation of liquid droplets of diameter less than or equal to 300 µm; c) drying said droplets; d) crushing the solid product obtained in stage c); e) mixing into a solution at least one surfactant, at least one aluminic precursor, optionally at least one silicic precursor and at least a fraction of the solid product obtained in stage d) so as to form a suspension; f) aerosol atomizing the suspension obtained in stage e) using a spray nozzle that leads to the formation of suspension droplets, which are precursors of the constituent spherical elementary particles of diameter D such that 10<D (µm)≤100 of the material according to the invention; g) drying said droplets obtained in stage f); and h) removing said surfactant introduced in stages a) and e) so as to obtain a mesostructured porosity material. Said method is referred to as "main preparation method according to the invention" in the rest of the description.

The volume percentage of non volatile compounds present in the suspension according to stage e) of the main preparation method of the invention is at least 7%, preferably at least 7.5% and more preferably at least 10%. Said volume percentage of non volatile compounds is defined as the ratio of the volume occupied by the non-volatile inorganic fraction in form of condensed oxide(s). ($AlO_{1.5}$ and optionally $SiO_2$) in each solid elementary particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$=final mass of the inorganic fraction in form of condensed oxide(s) present in the elementary particle, i.e. $AlO_{1.5}$ and optionally $SiO_2$ coming from either the inorganic precursors present in stage a) and stage e) of the main preparation method according to the invention, to which the inorganic fraction of the solid product of stage c) of the main preparation method of the invention has been added and $\rho_{inorg}$ is on average equal to (approximation valid for an "aluminosilicate network" type inorganic fraction). Similarly, the volume occupied by the non-volatile organic fraction $V_{org}$ is defined by ratio $m_{org}/\rho_{org}$ with $m_{org}$=mass of surfactant present in each elementary spherical particle, i.e. the surfactant present in stage a) and stage e) of the main preparation method according to the invention, to which the organic fraction of the solid product of stage c) of the main preparation method according to the invention has been added, and $\rho_{org}$=1 (approximation valid for a great majority of non volatile organic fraction). The total volume is such that $V_T = V_{inorg} + V_{org} + V_{solvent} + V_{inorg}$ and $V_{org}$ being defined above, and $V_{solvent}$ corresponds to the total volume of solvent consisting of water and optionally of an organic solvent.

According to said main preparation method of the invention, the fraction of solid product obtained in stage d) and used for carrying out said stage e) represents 1 to 100 wt. %, preferably 1 to 80 wt. % and more preferably 5 to 50 wt. % of the total amount of solid product crushed in stage d).

According to a first particular embodiment of the main preparation method of the invention, only part of the solid product from stage c) is crushed during stage d) of the method of the invention; the non-crushed part is generally not used later.

According to a second particular embodiment of the main preparation method of the invention, surfactant removal stage h) is carried out prior to the crushing stage according to stage d) so that said stage d) is conducted on a solid product free of organic surfactants. Stages a), b), c), h), d), e), and f) that have become consecutive in the particular case of said second preparation mode according to the invention are followed by a new cycle of droplet drying and removal of the surfactant introduced in stage e) as described according to stages g) and h).

For the particular case of the material according to the invention consisting of elementary spherical particles having a diameter D ranging between 11 and 50 µm, preferably between 15 and 50 µm, a simplified preparation method, referred to as "simplified preparation method according to the invention", is preferably carried out, which comprises the following stages: a) mixing into a solution at least one surfactant, at least one aluminic precursor and optionally at least one silicic precursor; b) aerosol atomizing the solution obtained in stage a) using a spray nozzle that leads to the formation of liquid droplets of diameter less than or equal to 300 µm; c) drying said droplets; and h) removing said surfactant so as to obtain a mesostructured porosity material. According to said simplified preparation method of the invention, the volume percentage of non-volatile compounds present in the solution according to stage a) of the simplified preparation method of the invention is at least 7%, preferably at least 7.5% and more preferably at least 10%. Said volume percentage of non-volatile compounds is defined as the ratio of the volume occupied by the non-volatile inorganic fraction in form of condensed oxide(s) ($AlO_{1.5}$ and optionally $SiO_2$) in each solid elementary spherical particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in the elementary particle, i.e. $AlO_{1.5}$ and optionally $SiO_2$ coming respectively from the inorganic precursors present in stage a) of the simplified preparation method according to the invention, and $\rho_{inorg}$ is on average 2 (approximation valid for an "aluminosilicate network" type inorganic fraction). Similarly, the volume occupied by the non-volatile organic fraction $v_{org}$ is defined by ratio $m_{org}/\rho_{org}$ with $m_{org}$=mass of surfactant present in each elementary spherical particle, i.e. the surfactant present in stage a) of the simplified preparation method according to the invention, and $\rho_{org}=1$ (approximation valid for a great majority of non-volatile organic fraction). The total volume is such that $V_T=V_{inorg}+V_{org}+V_{solvent}$, $V_{inorg}$ and $V_{org}$ being defined above, and $V_{solvent}$ corresponds to the total volume of solvent consisting of water and optionally of an organic solvent.

The aluminic precursor and optionally the silicic precursor used in stages a) and e) of the main preparation method according to the invention or in stage a) of the simplified preparation method according to the invention are inorganic oxide precursors known to the person skilled in the art, The aluminic precursor is advantageously on aluminium inorganic salt of formula $AlX_3$, X being a halogen or the $NO_3$ group. Preferably, X is chlorine. It is also possible to use an inorganic salt such as aluminium sulfate $Al_2(SO_4)_3$. The aluminic precursor can also be an organometallic precursor of formula $Al(OR")_3$ where R"=ethyl, isopropyl, n-butyl, s-butyl or t-butyl, or a chelated precursor such as acetylacetonate aluminium $(Al(C_5H_8O_2)_3)$. The aluminic precursor can also be an aluminium oxide or hydroxide, The silicic precursor, it present in stages a) and e) of the main preparation method according to the invention or in stage a) of the simplified preparation method according to the invention, is obtained from any silica source and advantageously from a sodium silicate precursor of formula $SiO_2,NaOH$, a chlorine-containing precursor of formula $SiCl_4$, an organometallic precursor of formula $Si(OR)_4$ where R=H, methyl, ethyl, or a chloroalkoxide precursor of formula $Si(OR)_{4-x}Cl_x$ where R=H, methyl, ethyl, x ranging between 0 and 4. The silicic precursor can also advantageously be an organometallic precursor of formula $Si(OR)_{4-x}R'_x$ where R=H, methyl, ethyl, and R' is an alkyl chain or a functionalized alkyl chain, for example by a thiol, amino, β diketone or sulfonic acid group, x ranging between 0 and 4.

The surfactant used in stages a) and e) of the main preparation method of the invention or in stage a) of the simplified preparation method of the invention is an ionic or non-ionic surfactant or a mixture thereof, Preferably, the ionic surfactant is selected from among the phosphonium and ammonium ions, more preferably among the quaternary ammonium salts such as cetyltrimethylammonium bromide (CTAB). Preferably, the non-ionic surfactant can be any copolymer having at least two parts of different polarities conferring amphiphilic macromolecule properties on them. These copolymers can comprise at least one block belonging to the non-exhaustive list of the following polymer families: fluorinated polymers (—[$CH_2$—$CH_2$—$CH_2$—$CH_2$—O—CO—R1— with R1 =$C_4F_9$, $C_5F_{17}$, etc.), biological polymers such as polyamino acids (poly-lysine, alginates, etc.), dendrimers, polymers consisting of poly(alkylene oxide) chains. Generally speaking, any copolymer of amphiphilic character known to the person skilled in the art can be used (S. Förster, M. Antionnetti, *Adv. Mater,* 1998, 10, 195-217; S. Förster, T, Plantenberg, *Angew. Chem. Int. Ed,* 2002, 41, 688-714 H. Cölfen, *Macromol. Rapid Commun,* 2001, 22, 219-252). Preferably, a block copolymer consisting of poly(alkylene oxide) chains is used within the scope of the present invention. Said block copolymer is preferably a block copolymer having two, three or four blocks, each block consisting of a poly(alkylene oxide) chain. For a two-block copolymer, one of the blocks consists of a poly(alkylene oxide) chain of hydrophilic nature and the other block consists of a poly (alkylene oxide) chain of hydrophobic nature. For a three-block copolymer, at least one of the blocks consists of a poly(alkylene oxide) chain of hydrophilic nature and at least one of the other blocks consists of a poly(alkylene oxide) chain of hydrophobic nature. Preferably, in the case of a three-black copolymer, the poly(alkylene oxide) chains of hydrophilic nature are poly(ethylene oxide) chains denoted by $(PEO)_x$ and $(PEO)_z$, and the poly(alkylene oxide) chains of hydrophobic nature are poly(propylene oxide) chains denoted by $(PPO)_y$, poly(butylene oxide) chains or mixed chains each chain of which is a mixture of several alkylene oxide monomers, More preferably, in the case of a three-block copolymer, a compound of formula $(PEO)_x-(PPO)_y-(PEO)_z$ is used, where x ranges between 5 and 300, y ranges between 33 and 300 and z ranges between 5 and 300. Preferably, the values of x and z are identical. A compound where x=20, y=70 and z=20 (P123) and a compound where x=106, y=70 and z=106 (F127) are very advantageously used. The commercial non-ionic surfactants known as Pluronic (BASF), Tetronic (BASF), Triton (Sigma), Tergitol (Union Carbide), Brij (Aldrich) can be used as non-ionic surfactants in stages a) and e) of the main method according to the invention or in stage a) of the simplified method according to the invention. For a four-block copolymer, two of the blocks consist of a poly(alkylene oxide) chain of hydrophilic nature and the other two blocks consist of a poly(alkylene oxide) chain of hydrophobic nature.

The atomization stage according to stages b) and f) of the main preparation method of the invention or the atomization stage according to stage b) of the simplified preparation method of the invention produces spherical droplets of diameter less than or equal to 300 μm by using a spray nozzle, and said nozzle can be "mono-fluid" or "bi-fluid" (with control of f he pressure of a gas such as compressed air or nitrogen) as it is well known to the person skilled in the art. For example, nozzles from Spraying System Emani can be used ("mono-fluid" nozzle of N22® type or "bi-fluid" of SU4® type for example). The size distribution of these droplets is of lognormal type. Atomization of the solution is carried out in a chamber into which a carrier gas, a dry air/nitrogen mixture for smaller plants and nitrogen alone for larger ones, is sent. According to stages c) and g) of the main preparation method of the invention or according to stage c) of the simplified method of the invention, said droplets are dried. Drying is performed through contact of said droplets with the aforementioned gas, which leads to the progressive evaporation of the solution, for example of the aquo-organic solution, respectively of the acidic aquo-organic solution, obtained in stage a), respectively stage e) of the mom preparation method according to the invention or the progressive evaporation of the solution obtained in stage a) of the simplified preparation method according to the invention, and thus to spherical elementary particles. The outlet temperature providing drying in the atomizer chamber ranges between 80° C. and 450° C. The distribution of the residence time of the droplets or of the particles in the atomization chamber is of the order of some seconds. During stage d) of the main method of the invention, the particles are crushed (air jet mill Netzsch CGS10 for example) and brought down to some pm (3 to 5 μm in general). Depending on the plant, the particles are collected at the outlet of a cyclone or in a bag filter. Drying of the particles according to stages c) and g) of the main method of the invention or according to stage c) of the simplified preparation method of the invention is advantageously followed by an additional thermal treatment at a temperature ranging between 50° C. and 300° C. prior to eliminating the surfactant in stage h) of the main method of the invention or of the simplified method of the invention so as to obtain the mesostructured porosity material according to the invention. Said elimination of the surfactant introduced in stages a) and e) of the main method according to the invention or in stage a) of the simplified method according to the invention is advantageously carried out using chemical extraction processes or thermal treatments, preferably calcination in air in a temperature range from 300° C. to 1000° C. and more precisely in a range from 450° C. to 600° C., during 1 to 24 hours, preferably during 2 to 6 hours.

The present invention also provides two alternative main methods of preparing a mesostructured/zeolitic mixed material according to the invention, i.e. a material wherein each spherical particle it is made of comprises a mesostructured matrix, entirely aluminic or of aluminosilicate nature, and zeolite nanocrystals have a pore opening ranging between 0.2 and 2 nm.

A first embodiment of one of the two main methods of preparing the material having zeolite nanocrystals trapped in the mesostructured oxide matrix according to the invention, referred to as first main method of preparing the mesostructured/zeolitic mixed material according to the invention, comprises the same stages a), b), c), d), e), f), g) and h) as the main preparation method according to the invention described above for the preparation of a mesostructured material having a mesostructured matrix that is entirely aluminic or of aluminosilicate nature. Said first main method of preparing the mesostructured/zeolitic mixed material according to the invention also comprises a prior stage $a_0$) consisting in synthesizing, in the presence of a structuring agent, zeolite nanocrystols of maximum nanometric size equal to 1000 nm in order to obtain a colloidal solution in which said nanocrystals are dispersed. Said colloidal solution obtained according to $a_0$) is fed into the mixture according to stages a) and e) of the main preparation method according to the invention described above in the present description. Said first main method of preparing the mesostructured/zeolitic mixed material according to the invention thus comprises: $a_0$) synthesizing, in the presence of at least one structuring agent, zeolite nanocrystals of maximum nanometric size equal to 1000 nm so as to obtain a colloidal solution in which said nanocrystals are dispersed; a') mixing into a solution at least one surfactant, at least one aluminic precursor and optionally at least one silicic precursor, and at least a colloidal solution obtained according to $a_0$); b') aerosol atomizing the solution obtained in stage a') using a spray nozzle that leads to the formation of liquid droplets of diameter less than or equal to 300 μm; c') drying said droplets; d') crushing the solid product obtained in stage c'); e') mixing into a solution at least one surfactant, at least one aluminic precursor, optionally at least one silicic precursor, at least a colloidal solution obtained according to $a_0$) and at least a fraction of the solid product obtained in stage d') so as to form a suspension; f') aerosol atomizing the suspension obtained in stage e') using a spray nozzle that leads to the formation of suspension droplets, which are precursors of the constituent spherical elementary particles of diameter D such that 10<D (μm)≤100 of the material according to the invention; g') drying said droplets obtained in stage f'); and h') removing said surfactant introduced in stages a') and e') so as to obtain a mesostructured/zeolitic mixed material.

The volume percentage of non-volatile compounds present in the suspension according to stage e') of the first main method of preparing the mesostructured/zeolitic mixed material according to the invention is at least 7%, preferably at least 7.5% and more preferably at least 10%. Said volume percentage of non-volatile compounds is defined as the ratio of the volume occupied by the non-volatile inorganic fraction in form of condensed oxide(s) in each solid elementary particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in said elementary spherical particle, i.e. $AlO_{1.5}$ and optionally $SiO_2$, and zeolite nanocrystals respectively coming from the inorganic precursors and the stable colloidal solution of the zeolite nanocrystals present in stage a') and stage e') of first main method of preparing the mesostructured/zeolitic mixed material according to the invention, to which the inorganic fraction of the solid product of stage c') of the first main method of preparing the mesostructured/zeolitic mixed material according to the invention has been added, and $\rho_{inorg}$ is on average equal to 2 (approximation valid for an "aluminosilicate network" type inorganic fraction). Similarly, the volume occupied by the non-volatile organic fraction $V_{org}$ is defined by ratio $m_{org}/\rho_{org}$ with $m_{org}$=mass of surfactant present in each elementary spherical particle, i.e. the surfactant present in stage a') and stage e') of the first main method of preparing the mesostructured/ zeolitic mixed material according to the invention, to which the organic fraction of the solid product of stage c') of the first main method of preparing the mesostructured/zeolitic mixed material according to the invention has been added, and $\rho_{org}$= (approximation valid for a great majority of non-volatile organic fraction). The total volume is such that $V_T = V_{inorg} + V_{org} + V_{solvent}$, $V_{inorg}$ and $V_{org}$ being defined above, and $V_{solvent}$ corresponds to the total volume of solvent consisting of water and optionally of an organic solvent.

According to said first main method of preparing the mesostructured/zeolitic mixed material according to the invention, the fraction of solid product obtained in stage d') and used for carrying out said stage e') represents 1 to 100 wt. %, preferably 1 to 80 wt. % and more preferably 5 to 50 wt. % of the total amount of solid product crushed in stage d').

According to a first particular embodiment of said first main method of preparing the mesostructured/zeolitic mixed material according to the invention, only part of the solid product from stage c') is crushed during stage d') of the method of the invention; the non-crushed part is generally not used later.

According to a second particular embodiment of said first main method of preparing the mesostructured zeolitic mixed material according to the invention, surfactant removal stage h') is carried out prior to the crushing stage according to stage d') so that said stage d') is conducted on a solid product free of organic surfactants. Stages a'), b'), c'), h'), d'), e'), and f') that have become consecutive in the particular case of said second method of preparing the mesostructured/zeolitic mixed material according to the invention are followed by a new cycle of droplet drying and removal of the surfactant introduced in stage e') as described according to stages g') and h').

For the particular case of the material according to the invention consisting of elementary spherical particles having a diameter D ranging between 11 and 50 μm, preferably between 15 and 50 μm, and comprising a mesostructured matrix, entirely aluminic or of aluminosilicate nature, and zeolite nanocrystals having a pore opening ranging between 0.2 and 2 nm, a simplified preparation method, referred to as "first simplified method of preparing the mesostructured/ zeolitic mixed material according to the invention", is preferably carried out, which comprises the following stages: $a_0$)

synthesizing, in the presence of at least one structuring agent, zeolite nanocrystals of maximum nanometric size equal to 1000 nm, so as to obtain a colloidal solution in which said nanocrystals are dispersed; a') mixing into a solution at least one surfactant, at least one aluminic precursor and optionally at least one silicic precursor, and at least a colloidal solution obtained according to $a_0$); b') aerosol atomizing the solution obtained in stage a') using a spray nozzle that leads to the formation of liquid droplets of diameter less than or equal to 300 µm; c') drying said droplets and h') removing said surfactant so as to obtain a mesostructured/zeolitic mixed material.

According to said first simplified method of preparing the mesostructured/zeolitic mixed material according to the invention, the volume percentage of non-volatile compounds present in the solution according to stage a') of the first simplified method of preparing the mesostructured/zeolitic mixed material according to the invention is at least 7%, preferably at least 7.5% and more preferably at least 10%. Said volume percentage of non-volatile compounds is defined as the ratio of the volume occupied by the non-volatile inorganic fraction in form of condensed oxide(s) in each solid elementary spherical particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in the elementary particle, i.e. $AlO_{1.5}$ and optionally $SiO_2$ and zeolite nanocrystals coming respectively from the inorganic precursors and the stable colloidal solution of the zeolite nanocrystals present in stage a') of the first simplified method of preparing the mesostructured/zeolitic mixed material according to the invention, and $\rho_{inorg}$ is on average 2 (approximation valid for an "aluminosilicate network" type inorganic fraction). Similarly, the volume occupied by the non-volatile organic fraction $V_{org}$ is defined by ratio $m_{org}/\rho_{org}$ with $m_{org}$=mass of surfactant present in each elementary spherical particle, i.e. the surfactant present in stage a') of the first simplified method of preparing the mesostructured/zeolitic mixed material according to the invention, and $\rho_{org}$=1 (approximation valid for a great majority of non-volatile organic fraction). The total volume is such that $V_T = V_{inorg} + V_{org} + V_{solvent}$, $V_{inorg}$ and $V_{org}$ being defined above, and $V_{solvent}$ corresponds to the total volume of solvent consisting of water and optionally of an organic solvent.

According to stage $a_0$) of the first main method, respectively of the first simplified method of preparing the mesostructured/zeolitic mixed material according to the invention, the zeolite nanocrystals are synthesized according to operating protocols known to the person skilled in the art. In particular, the synthesis of beta zeolite nanocrystals has been described by T. Bein et al., *Micropor. Mesopor. Mater.*, 2003, 64, 165. The synthesis of Y zeolite nanocrystals has been described by T. J. Pinnavaia et al., *J. Am. Chem. Soc.*, 2000, 122, 8791 The synthesis of faujasite zeolite nanocrystals has been described by Kloetstra. et al., *Microporous Mater.*, 1996, 6, 287. The synthesis of ZSM-5 zeolite nanocrystals has been described in various publications: R. de Ruiter et al., *Synthesis of Microporous Materials*, Vol. 1 ; M. L. Occelli, H. E. Robson (eds.), Van Nostrand Reinhold, New York, 1992, 167; A. E. Persson, B. J. Schoeman, J. Sterte, J.-E. Otterstedt, *Zeotites*, 1995, 15, 611-619. Zeolite nanocrystals are generally synthesized by preparing a reaction mixture containing at least one silicic source, optionally at least one source of at least one element T selected from among aluminium, iron, boron, indium and gallium, preferably at least one aluminic source and at least one structuring agent. The reaction mixture is either aqueous or aquo-organic, a water-alcohol mixture for example. The reaction mixture is advantageously brought under hydrothermal conditions under autogenous pressure, optionally by adding gas, nitrogen for example, at a temperature ranging between 50° C. and 200° C., preferably between 60° C. and 170° C., and more preferably at a temperature that does not exceed 120° C. until formation of zeolite nanocrystals. At the end of said hydrothermal treatment, a colloidal solution wherein the nanocrystals are in the dispersed state is obtained, The structuring agent can be ionic or neutral depending on the zeolite to be synthesized. Structuring agents from the following non-exhaustive list are frequently used: nitrogen-containing organic cations, elements from the alkaline family (Cs, K, Na, etc.), crown ethers, diamines, as well as any other structuring agent known to the person skilled in the art.

In a second embodiment of the method of preparing the mesostructured/zeolitic mixed material according to the invention, referred to hereafter as "second main method of preparing the mesostructured/zeolitic mixed material according to the invention", zeolite crystals are initially used, which have the specific feature of dispersing in form of nanocrystals of maximum nanometric size equal to 1000 nm in solution, for example in acidic aquo-organic solution. Said zeolite crystals are introduced in the mixture according to stages a) and e) of the main preparation method of the invention described above for preparation of a mesostructured material having a mesostructured matrix that is entirely aluminic or of aluminosilicate nature. Said second main method of preparing the mesostructured/zeolitic mixed material according to the invention comprises: a") mixing into a solution at least one surfactant, at least one aluminic precursor, optionally at least one silicic precursor and zeolite crystals dispersed in form of nanocrystals of maximum nanometric size equal to 1000 nm in said solution; b–) aerosol atomizing the solution obtained in stage a") using a spray nozzle that leads to the formation of liquid droplets of diameter less than or equal to 300 µm; c") drying said droplets; d") crushing the solid product obtained in stage c"); e") mixing into a solution at least one surfactant, at least one aluminic precursor, optionally at least one silicic precursor, zeolite crystals dispersed in form of nanocrystals of maximum nanometric size equal to 1000 nm in said solution and at least a fraction of the solid product obtained in stage d") so as to form a suspension; f") aerosol atomizing the suspension obtained in stage e") using a spray nozzle that leads to the formation of suspension droplets, which are precursors of the constituent spherical elementary particles of diameter D such that 10<D (µm)≤100 of the material according to the invention; g") drying said droplets obtained in stage f"); and h") removing said surfactant introduced in said stages a") and e") so as to obtain a mesostructured/zeolitic mixed material.

The volume percentage of non-volatile compounds present in the suspension according to stage e") of the second main method of preparing the mesostructured/zeolitic mixed material according to the invention is at least 7%, preferably at least 7.5% and more preferably at least 10%. Said volume percentage of non-volatile compounds is defined as the ratio of the volume occupied by the non-volatile inorganic fraction in form of condensed oxide(s) in each solid elementary particle obtained after atomization, plus the volume occupied by the non-volatile organic fraction found in the some solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in the elementary particle, i.e. $AlO_{1.5}$ and optionally $SiO_2$, and zeolite nonocrystals respectively coming from the inorganic precursors and zeolite crystals that disperse in form of nanocrystals of maximum nonometric size equal to 1000 nm present in stage a") and stage e") of the second main method of preparing the mesostructured/zeolitic mixed material according to the invention, to which the inorganic fraction of the solid product of stage c") of the second main method of preparing the mesostructured/zeolitic mixed material according to the invention has been added, and $\rho_{inorg}$ is on average equal to 2 (approximation valid for an "aluminosilicate network" type inorganic fraction). Similarly, the volume occupied by the non-volatile organic fraction Wig is defined by ratio $m_{org}/\rho_{org}$ with $m_{org}$=mass of surfactant present in each elementary spherical particle, i.e. the surfactant present in stage a") and stage e") of the second main method of preparing the mesostructured/zeolitic mixed material according to the invention, to which the organic fraction of the solid product of stage c") of the second main method of preparing the mesostructured/zeolitic mixed material according to the invention has been added, and $\rho_{org}$=1 (approximation valid for a great majority of non-volatile organic fraction). The total volume is such that $V_T=V_{inorg}+V_{org}+V_{solvent}$, $V_{inorg}$ and $V_{org}$ being defined above, and $V_{solvent}$ corresponds to the total volume of solvent consisting of water and optionally of an organic solvent.

According to said second main method of preparing the mesostructured/zeolitic mixed material according to the invention, the fraction of solid product obtained in stage d") and used for carrying out said stage e") represents 1 to 100 wt. %, preferably 1 to 80 wt. % and more preferably 5 to 50 wt. % of the total amount of solid product crushed in stage d").

According to a first particular embodiment of said second main method of preparing the mesostructured/zeolitic mixed material according to the invention, only part of the solid product from stage c") is crushed during stage d") of the method of the invention the non-crushed part is generally not used later.

According to a second particular embodiment of said second main method of preparing the mesostructured/zeolitic mixed material of the invention, surfactant removal stage h") is carried out prior to the crushing stage according to stage d") so that said stage d") is conducted on a solid product free of organic surfactants. Stages a"), b"), c"), h"), d"), e"), and f") that have become consecutive in the particular case of said second mode of preparing the mesostructured/zeolitic mixed material according to the invention are followed by a new cycle of droplet drying and removal of the surfactant introduced in stage e") as described according to stages g") and h"). For the particular case of the material according to the invention consisting of spherical particles having a diameter D ranging between 11 and 50 μm, preferably between 15 and 50 μm, and comprising a mesostructured matrix, entirely aluminic or of aluminosilicate nature, and zeolite nanocrystals having a pore opening ranging between 0.2 and 2 nm, a simplified preparation method, referred to as "second simplified method of preparing the mesostructured/zeolitic mixed material according to the invention", is preferably carried out, which comprises the following stages: a") mixing into o solution at least one surfactant, at least one aluminic precursor, optionally at least one silicic precursor, and zeolite crystals that disperse in form of nanocrystals of maximum nanometric size equal to 1000 nm in said solution b") aerosol atomizing the solution obtained in stage a") using a spray nozzle that leads to the formation of liquid droplets of diameter less than or equal to 300 μm; c") drying said droplets; and h") removing said surfactant introduced in stage a") so as to obtain a mesostructured/zeolitic mixed material.

The volume percentage of non-volatile compounds present in the suspension according to stage a") of the second simplified method of preparing the mesostructured/zeolitic mixed material according to the invention is at least 7%, preferably at least 7.5% and more preferably at least 10%. Said volume percentage of non-volatile compounds is defined as the ratio of the volume occupied by the non-volatile inorganic traction in form of condensed oxide(s) in each solid elementary particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in the elementary particle, i.e. $AlO_{1.5}$ and optionally $SiO_2$, and zeolite nanocrystals respectively coming from the inorganic precursors and zeolite crystals that disperse in form of nanocrystals of maximum nanometric size equal to 1000 nm present in stage a") of the second simplified method of preparing the mesostructured/zeolitic mixed material according to the invention, and $\rho_{inorg}$ is on average equal to 2 (approximation valid for an "aluminosilicate network" type inorganic fraction). Similarly, the volume occupied by the non-volatile organic fraction $V_{org}$ is defined by ratio $m_{org}/\rho_{org}$ with $m_{org}$=mass of surfactant present in each elementary spherical particle, i.e. the surfactant present in stage a") of the second simplified method of preparing the mesostructured/zeolitic mixed material according to the invention, and $\rho_{org}$=1 (approximation valid for a great majority of non-volatile organic fraction). The total volume is such that $V_T=V_{inorg}+V_{org}+V_{solvent}$, $V_{inorg}$ and $V_{org}$ being defined above, and $V_{solvent}$ corresponds to the total volume of solvent consisting of water and optionally of an organic solvent.

In stage a") of the second (main and simplified) method of preparing the mesostructured/zeolitic mixed material according to the invention, zeolite crystals are used. Any crystallized zeolite known in the state of the art, which has the property of dispersing in solution, for example in an acidic aquo-organic solution, in form of nanocrystals of maximum nanometric size equal to 1000 nm, is suitable for carrying out stage a") of the second main method of preparing the mesostructured/zeolitic mixed material according to the invention or of the second simplified method of preparing the mesostructured/zeolitic mixed material according to the invention. Said zeolite crystals are synthesized by means known to the person skilled in the art. The zeolite crystals used in stage a") of the second main method of preparing the mesostructured/zeolitic mixed material according to the invention or in the second simplified method of preparing the mesostructured/zeolitic mixed material according to the invention can already come in form of nanocrystals. Zeolite crystals of size above 1000 nm, for example between 1500 nm and 3 μm, that disperse in solution, for example in an aquo-organic solution, preferably an acidic aquo-organic solution, in form of nanocrystals of maximum nanometric size equal to 1000 nm, are also advantageously used. It is also possible to obtain zeolite crystals that disperse in form of nanocrystals of maximum nanometric size equal to 1000 nm by carrying out functionalization of the nanocrystal surface. The zeolite crystals used are either in their as-synthesized form, i.e. still containing the structuring agent, or in their calcined form, i.e. freed of said structuring agent. When the zeolite crystals used are in their as-synthesized form, said structuring agent is removed during stage h") of the second method (second main method, respectively second simplified method) of preparing the mesostructured/zeolitic mixed material according to the invention.

According to the two main methods of preparing the mesostructured/zeolitic mixed material according to the invention, respectively to the two simplified methods of preparing the mesostructured/zeolitic mixed material according to the invention, the aluminic precursor and optionally the silicic precursor used in stages a') and e') of the first main method of preparing the mesostructured/zeolitic mixed material according to the invention, respectively in stage a') of the first simplified method of preparing the mesostructured/zeolitic mixed material according to the invention, or in stages a") and e") of the second main method of preparing the mesostructured/zeolitic mixed material according to the invention, respectively in stage a") of the second simplified method of preparing the mesostructured/zeolitic mixed material according to the invention, are those already mentioned above in the description of the main preparation method according to the invention for preparing a mesostructured material having a mesostructured matrix that is entirely aluminic or of aluminosilicate nature. The same goes for the surfactant used in stages a') and e') of the first main method of preparing the mesostructured/zeolitic mixed material according to the invention, respectively in stage a') of the first simplified method of preparing the mesostructured/zeolitic mixed material according to the invention, or in stages a") and e") of the second main method of preparing the mesostructured/zeolitic mixed material according to the invention, respectively in stage a") of the second simplified method of preparing the mesostructured/zeolitic mixed material according to the invention. It can be an ionic or non-ionic surfactant. A surfactant coming in form of a block copolymer consisting of poly(alkylene oxide) chains is particularly preferred. A precise description of this form of surfactant is given above in the present description for the preparation of a mesostructured material having a mesostructured matrix that is entirely aluminic or of aluminosilicate nature (stages a) or e) of the main preparation method according to the invention).

The solution in which are mixed all according to stages a) and e) of the main preparation method of the invention, respectively according to stage a) of the simplified preparation method of the invention, or according to stages a') and e') of the first main method of preparing the mesostructured/zeolitic mixed material of the invention, respectively according to stage a') of the first simplified method of preparing the mesostructured/zeolitic mixed material of the invention, or according to stages a") and e") of the second main method of preparing the mesostructured/zeolitic mixed material according to the invention, respectively stage a") of the second simplified method of preparing the mesostructured/zeolitic mixed material according to the invention, can be acidic, neutral or basic. Preferably, said solution according to the aforementioned stages is acidic and it has a maximum pH value of 3, preferably ranging between 0 and 2. The acids used to obtain an acidic solution of maximum pH value equal to 3 are, by way of non-exhaustive example, hydrochloric acid, sulfuric acid and nitric acid. Said solution can be aqueous or it can be a mixture of water and organic solvent, the organic solvent being preferably a water-miscible polar solvent such as THF or an alcohol, in the latter case preferably ethanol. Said solution can also be practically organic, preferably practically alcoholic, the proportion of water being such that hydrolysis of the inorganic precursors is ensured (stoichiometric amount). More preferably, said solution in which are mixed at least one aluminic precursor, at least one surfactant and optionally at least one silicic precursor is an acidic aquo-organic mixture, more preferably an acidic water-alcohol mixture. In the preferred case where the matrix of the material according to the invention contains silicon oxide in addition to aluminium oxide, the silicic and aluminic precursor concentrations in stages a) and e) of the main preparation method according to the invention, respectively in stage a) of the simplified preparation method according to the invention, or in stages a') and e') of the first main method of preparing the mesostructured/zeolitic mixed material according to the invention, respectively in stage a') of the first simplified method of preparing the mesostructured/zeolitic mixed material according to the invention, or in stages a") and e") of the second main method of preparing the mesostructured/zeolitic mixed material according to the invention, respectively in stage a") of the second simplified method of preparing the mesostructured/zeolitic mixed material according to the invention, are defined by the Si/Al molar ratio, which is strictly below 1. For the preparation of a mesostructured/zeolitic mixed material according to the invention, the amount of zeolite nanocrystals dispersed in the colloidal solution introduced in stages a') and e') of the first main method of preparing the mesastructured/zeoltic mixed material according to the invention, respectively in stage a') of the first simplified method of preparing the mesostructured/zeolitic mixed material according to the invention, or the amount of zeolite crystals introduced in stages a") and e") of the second main method of preparing the mesostructured/zeolitic mixed material according to the invention, respectively in stage a") of the second simplified method of preparing the mesostructured/zeolitic mixed material according to the invention, is such that the zeolite nanocrystals advantageously represent 0.1 to 30 wt. %, preferably 0.1 to 20 wt. % and more preferably 0.1 to 10 wt. % of the mesostructured/zeolitic mixed material according to the invention. The initial concentration in surfactant introduced in the mixture according to stages a) and e) of the main preparation method of the invention or in stage a) of the simplified preparation method of the invention, respectively in stage a) of the simplified preparation method of the invention, or in stages a') and e') of the first main method of preparing the mesostructured/zeolitic mixed material according to the invention, respectively in stage a') of the first simplified method of preparing the mesostructured/zeolitic mixed material according to the invention, or in stages a") and e") of the second main method of preparing the mesostructured/zeolitic mixed material according to the invention, respectively stage a") of the second simplified method of preparing the mesostructured/zeolitic mixed material according to the invention, is defined by $c_0$, and $c_0$ is defined in relation to the critical micelle concentration ($c_{mc}$) known to the person skilled in the art. $c_{mc}$ is the limit concentration above which the phenomenon of self-assembly of the surfactant molecules in the solution according to each one at the 6 methods occurs. Concentration $c_0$ can be less than, equal to or greater than $c_{mc}$, preferably it is less than $c_{mc}$. In a preferred embodiment of each one of the six methods according to the invention (main preparation method according to the invention and simplified preparation method according to the invention, first main method of preparing the mesostructured/zeolitic mixed material according to the invention and first simplified method of preparing the mesostructured/zeolitic mixed material according to the invention, second main method of preparing the mesostructured/zeolitic mixed material according to the invention and second simplified method of preparing the mesostructured/zeolitic mixed material according to the invention), concentration $c_0$ is less than $c_{mc}$ and said solution according to each one of stages a), e), a'), e'), a") and e") of each one of the six preparation methods of the invention is an acidic water-alcohol mixture.

In cases where the solution according to each one of stages a), e), a'), e'), a") and e") of each one of the six preparation methods according to the invention is a water-organic solvent mixture, preferably acidic, it is preferred in each one of stages a), e), a'), e'), a") and e") of each one of the six preparation methods according to the invention that the surfactant concentration at the origin of the matrix mesostructuration be lower than the critical micelle concentration, so that the evaporation of said aquo-organic solution, preferably acidic, in each one of stages b), f), b'), f'), b") and f") of each one of the six preparation methods according to the invention using the aerosol technique induces a micellization or self-assembly phenomenon leading to the mesostructuration of the matrix of the material according to the invention. In case of preparation of a mesostructured/zeolitic mixed material, mesostructuration of the matrix of the material occurs around the zeolite nanocrystals that remain unchanged in their shape and size in stages b'), f') and c'), g') of the first main method of preparing the mesostructured/zeolitic mixed material according to the invention, respectively in stages b') and c') of the first simplified method of preparing the mesostructured/zeolitic mixed material according to the invention, or in stages b"), f') and c"), g") of the second main method of preparing the mesostructured/zeolitic mixed material according to the invention, respectively in stages b") and g") of the second simplified method of preparing the mesostructured/zeolitic mixed material according to the invention. When $c_0 < c_{mc}$, the mesostructuration of the matrix of the material according to the invention is the result of a progressive concentration, within each droplet, of the aluminic precursor, of the surfactant and optionally of the silicic precursor, up to a surfactant concentration $c_0 < c_{mc}$ resulting from an evaporation of the aquo-organic solution, preferably acidic.

In general terms, the combined concentration increase of the aluminic precursor, optionally of the silicic precursor and of the surfactant, causes precipitation of the aluminic precursor and optionally of the silicic precursor, hydrolyzed, around the self-organized surfactant and, consequently, the structuration of the material according to the invention. The inorganic/inorganic phase, organic/organic phase and organic/inorganic phase interactions lead, through a cooperative self-assembly mechanism, to the condensation of the hydrolyzed aluminic precursor and optionally of the hydrolyzed silicic precursor around the self-organized surfactant. In case of preparation of a mesostructured/zeolitic mixed material, the zeolite nanocrystals are trapped, during said self-assembly phenomenon, in the matrix based on aluminium oxide, mesostructured, contained in each elementary spherical cell making up the material according to the invention.

Using spray nozzles is particularly advantageous for constraining the reactants present in the initial solution to interact with one another, no loss of matter, except for the solvents, being possible, all of the elements aluminium and optionally silicon initially present being thus perfectly preserved throughout the three methods according to the invention, instead of being eliminated during the filtering and washing stages encountered in conventional synthesis methods known to the person skilled in the art.

Obtaining spherical elementary particles of diameter D such that $10 < D$ ($\mu$m)$\leq 100$ by means of the EISA method, in particular using the aerosol technique, specific to the invention, requires increased knowledge and control of the synthesis operating parameters, essentially for stages a), b), e) and f) of the main preparation method according to the invention or stages a) and b) of the simplified method according to the invention, or stages a'), b'), e') and f') of the first main method of preparing the mesostructured/zeolitic mixed material according to the invention, or stages a') and b') of the first simplified method of preparing the mesostructured/zeolitic mixed material according to the invention, or stages a"), b"), e") and f") of the second main method of preparing the mesostructured/zeolitic mixed material according to the invention, or stages a") and b") of the second simplified method of preparing the mesostructured/zeolitic mixed material according to the invention, in order to maintain the mesostructuration process through self-assembly of the surfactant jointly with the hydrolysis/condensation reactions of the various inorganic precursors. In fact, the production of droplets of diameter less than or equal to 300 $\mu$m leads to kinetics of evaporation of the aquo-organic solution or suspension that are all the slower since the droplet is large (because proportional to the square of the diameter of the drop to be evaporated). If the total evaporation time is slower than the condensation time of the inorganic matter on the periphery of the drop, a layer of condensed material forms at the evaporation interface, thus forming an additional evaporation barrier. If this additional layer becomes rigid before enough solvent, i.e. water to which an organic solvent has possibly been added, has evaporated, the ratio of the volume of the polar constituents to the volume of the apolar constituents in the mixtures according to stages a) and e) of the main method of the invention or in the mixture according to stage a) of the simplified method of the invention, or in the mixtures according to stages a') and e') of the first main method of preparing the mesostructured/zeolitic mixed material of the invention, or in the mixture according to stage a') of the first simplified method of preparing the mesostructured/zeolitic mixed material of the invention, or in the mixtures according to stages a") and e") of the second main method of preparing the mesostructured/zeolitic mixed material of the invention, or in the mixture according to stage a") of the second simplified method of preparing the mesostructured/zeolitic mixed material of the invention, denoted by $V_{pol}/V_{apol} = (V_{inorg} + V_{solvent} + V_{org\ polar})/(V_{org\ hydrophobic})$, a critical parameter that conditions the appearance of a mesostructuration, is variable between the "rigid surface film" and "particle core" zones (with $V_{inorg} = m_{inorg}/\rho_{inorg}$ as defined above in the present description and $V_{org\ polar} + V_{org\ hydrophobic} = V_{org}$ also as defined above in the present description and $V_{solvent}$ = total volume of solvent, the solvent being made up of water and optionally an organic solvent, $V_{org\ polar}$ = volume of the polar parts of the organic reactants, $V_{org\ hydrophobic}$ = volume of the apolar parts of the organic reactants). At the core, the elements present then have to accommodate the mesostructuration to a total volume (defined by the volume inscribed in the rigid skin) greater than the optimum value. If ratio $V_{pol}/V_{apol}$ is too far from the optimum mesostructuration value, the mesostructure homogeneity of the particles produced deteriorates and can disappear to form particles consisting of a well-mesostructured skin and of a non-mesostructured core (amorphous or resulting from a spinodal decomposition depending on the constituent elements and solvents used). In order to avoid this phenomenon likely to impede the elaboration of the material according to the invention, the volume of solvent to be evaporated has to be limited in stages b) and f) of the main method according to the invention, respectively in stage b) of the simplified method according to the invention, in stages b') and f') of the first main method of preparing the mesostructured/zeolitic mixed material of the invention, respectively in stage b') of the first simplified method of preparing the mesostructured/zeolitic mixed material of the invention, in stages b") and f") of the second main method of preparing the mesostructured/zeolitic mixed material of the invention, respectively in stage b') of the second simplified method of preparing the mesostructured/zeolitic mixed material of the invention, in other words, the aerosoled solutions have to be concentrated in order to work preferably with a value $c_0$ close to or greater than $c_{mc}$. This is translated into the presence of non-volatile compounds in the suspension according to stage e) of the main preparation method of the invention and in the solution according to stage a) of the simplified preparation method of the invention, according to stage e') of the first main method of preparing the mesostructured/zeolitic mixed material of the invention, and in the solution according to stage a') of the first simplified method of preparing the mesostructured/zeolitic mixed material of the invention, according to stage e") of the second main method of preparing the mesostructured/zeolitic mixed material of the invention, and in the solution according to stage a") of the second simplified method of preparing the mesostructured/ zeolitic mixed material of the invention, in such an amount that the volume percentage of said compounds present in said suspension/solution is at least 7%. The maximum value of this volume percentage is specific to each system and it is mainly limited by three criteria: (i) the lack of stability over time of the solutions obtained in stages a) and e) of the main method of the invention, respectively in stage a) of the simplified method of the invention, of the solutions obtained in stages a') and e') of the first main method of preparing the mesostructured/zeolitic mixed material of the invention, respectively in stage a) of the first simplified method of preparing the mesostructured/zeolitic mixed material of the invention, of the solutions obtained in stages a") and e") of the second main method of preparing the mesostructured/zeolitic mixed material of the invention, respectively in stage a") of the second simplified method of preparing the mesostructured/zeolitic mixed material of the invention, (ii) the spontaneous precipitation of the solution at too high concentrations (either through lack of solubility of one or more constituents, or through condensation reaction of the inorganic constituents present in solutions obtained in stages a) and e) of the main method of the invention, respectively in stage a) of the simplified method of the invention), in stages a') and e') of the first main method of preparing the mesostructured/zeolitic mixed material of the invention, respectively in stage a') of the first simplified method of preparing the mesostructured/zeolitic mixed material of the invention, of the solutions obtained in stages a") and e") of the second main method of preparing the mesostructured/zeolitic mixed material of the invention, respectively in stage a") of the second simplified method of preparing the mesostructured/ zeolitic mixed material of the invention, and (iii) the rheological properties of the solutions obtained in stages a) and e) of the main method of the invention, respectively in stage a) of the simplified method of the invention, in stages a') and e') of the first main method of preparing the mesostructured/ zeolitic mixed material of the invention, respectively in stage a') of the first simplified method of preparing the mesostructured/zeolitic mixed material of the invention, of the solutions obtained in stages a") and e") of the second main method of preparing the mesostructured/zeolitic mixed material of the invention, respectively in stage a") of the second simplified method of preparing the mesostructured/zeolitic mixed material of the invention, which may become unsuitable for droplet formation through the spray nozzles (viscosity too high for example).

Stages b'), f'), c'), g'), d') and h') according to the first main method of preparing the mesostructured/zeolitic mixed material of the invention, respectively stages b'), c') and h') according to the first simplified method of preparing the mesostructured/zeolitic mixed material of the invention, or stages b"), f"), c"), g"), d") and h") according to the second main method of preparing the mesostructured/zeolitlc mixed material of the invention, respectively stages b"), c") and h") according to the second simplified method of preparing the mesostructured/zeolitic mixed material of the invention, are carried out under the same operating conditions as those in stages b), f), c), g), d) and h) of the main preparation method according to the invention, respectively stages b), c) and h) of the simplified preparation method according to the invention.

The mesostructured material according to the invention, optionally exhibiting zeolite nanocrystals trapped within the mesostructured matrix, is characterized by means of several analysis techniques, notably small-angle X-ray diffraction (SAXD), wide-angle X-ray diffraction (WAXD), nitrogen volumetric analysis (BET), transmission electron microscopy (TEM), scanning electron microscopy (SEM) and inductively coupled plasma emission spectrometry (ICP).

The small-angle X-ray diffraction technique (values of angle 2θ ranging between 0.5° and 6°) allows to characterize the periodicity, on the nanometric scale, generated by the organized mesoporosity of the mesostructured matrix of the material according to the invention, In the description hereafter, analysis of the X rays is carried out on powder with a reflection diffractometer equipped with a rear monochromator, using copper radiation (wavelength 1.5406 Å). The peaks usually observed in diffractograms corresponding to a given value of angle 2θ are associated with the inter-reticular distances $d_{(hkl)}$ characteristic of the structural symmetry of the material, ((hkl) being the Miller indices of the reciprocal network) by the Bragg relation: $2\ d_{(hkl)}*\sin(\theta)=n*\lambda$. This indexing then allows to determine the cell parameters (abc) of the direct network, the value of these parameters being a function of the hexagonal, cubic, cholesteric, lamellar, bicontinuous or vermicular structure obtained. For example, the small-angle X-ray diffractogram of a mesostructured material consisting of elementary spherical particles comprising an aluminosilicate matrix and obtained according to one of the six preparation methods described above, via the use of the particular block copolymer poly (ethylene oxide)$_{20}$-poly(propylene oxide)$_{70}$-poly (ethylene oxide)$_{20}$ ($PEO_{20}$-$PPO_{70}$-$PEO_{20}$ or Pluronic 123) has a perfectly resolved correlation peak corresponding to the correlation distance between pores d characteristic of a structure of vermicular type and defined by the Bragg relation $2\ d*\sin(\theta)=n*\lambda$. The wide-angle X-ray diffraction technique (values of angle 2θ ranging between 5° and 100°) allows to characterize a crystallized solid defined by the repetition of a unit motif or elementary cell on the molecular scale. It follows the same physical principle as the one that governs the small-angle X-ray diffraction technique. The wide-angle XRD technique is thus used to analyze the mesostructured/zeolitic mixed materials because it is particularly well-suited for structural characterization of the zeolite nanocrystals present in each elementary spherical particle making up the mesostructured/zeolitic mixed material according to the invention. In particular, it allows to have access to the pore size of the zeolite nanocrystals. For example, the wide-angle and small-angle X-ray diffractograms of a mesostructured/zeolitic mixed material obtained according to the first or second method of preparing a mesostructured/zeolitic mixed material of the invention, comprising zeolite nanocrystals of ZSM-5 (MFI) type, the mesostructured matrix being of aluminosilicate nature and obtained using the particular block copolymer poly (ethylene oxide)$_{106}$-poly (propylene oxide)$_{70}$-poly (ethylene oxide)$_{106}$-$PPO_{70}$-$PEO_{106}$ or F127) respectively exhibit the diffractogram associated with the group of symmetry Pnma (No. 62) of the ZSM-5 zeolite at wide angles and a correlation peak perfectly resolved at the small angles, associated with the vermicular type structure of the mesostructured matrix that corresponds to a correlation distance d between the pores. The angle value obtained in the XR diffractogram allows to find the correlation distance d according to the Bragg law: $2 d_{(hkl)}*\sin(\theta)=n*\lambda$. The values of the cell parameters a, b, c obtained for the zeolite nanocrystal characterization are coherent with the values obtained for a ZSM-5 (MFI) type zeolite known to the person skilled in the art "Collection of simulated XRD powder patterns for zeolites", 4th revised Edition, 2001; M. M. J. Treacy, J. B. Higgins).

Nitrogen volumetric analysis, which corresponds to the physical adsorption of nitrogen molecules in the pores of the material via a progressive pressure increase at constant temperature, provides information on the particular textural characteristics (pore diameter, porosity type, specific surface area) of the material according to the invention. In particular, it allows to know the specific surface area and the mesopore distribution of the material. What is referred to as the specific surface area is the BET specific surface area ($S_{BET}$ in $m^2/g$) determined by nitrogen adsorption according to the ASTM D 3663-78 standard established from the Brunauer-Emmett-Teller method described in "The Journal of American Society", 1938, 60, 309. The pore distribution representative of a mesopore population centered in a 1.5-50 nm range is determined by means of the Barrett-Joyner-Halenda (BJH) model. The nitrogen adsorption-desorption isotherm according to the BJH model thus obtained is described in ¢The Journal of American Society∞, 1951, 73, 373, written by E. P. Barrett, L. G. Joyner and P. P. Halenda. In the description that follows, the mesopore diameter $\phi$ of the mesostructured matrix corresponds to the mean diameter upon nitrogen adsorption defined as a diameter such that all the pores having a size below this diameter make up 50% of the pore volume (Vp) measured on the adsorption branch of the nitrogen isotherm. Furthermore, the shape of the nitrogen adsorption isotherm and of the hysteresis loop can give information about the nature of the mesoporosity and the possible presence of amicroporosity essentially linked with the zeolite nanocrystals when they are present in the mesostructured oxide matrix. For example, the nitrogen adsorption isotherm relative to a mesostructured aluminosilicate material according to the invention, obtained by means of the main preparation method of the invention, using as the surfactant the particular block copolymer poly(ethylene oxide)$_{20}$-poly(propylene oxide)$_{70}$-poly(ethylene oxide)$_{20}$ (PEO$_{20}$-PPO$_{70}$-PEO$_{20}$ or Pluronic 123 or P123), is characterized by an adsorption isotherm of class IV and a hysteresis loop of Hi type, the associated pore distribution curve being representative of a population of mesopores of uniform size around the 410 nm range. By way of example of a mesostructured/zeolitic mixed material, the nitrogen adsorption isotherm of such a material obtained according to one of the six methods of preparing a mesostructured/zeolitic mixed material of the invention and comprising zeolite nanocrystals of ZSM-5 (MFI) type, the mesostructured matrix being of aluminosilicate nature and obtained via the use of the particular block copolymer poly(ethylene oxide)$_{106}$-poly (propylene oxide)$_{70}$-poly (ethylene oxide)$_{106}$ (PEO$_{106}$-PPO$_{70}$-PEO$_{106}$ or F127), exhibits for low P/PD values (where P0 is the saturated vapour pressure at temperature T) an isotherm of type I characteristic of a microporous material and, for high P/P0 values, an isotherm of type IV and a hysteresis loop of type H1, the associated pore distribution curve being representative of a mesopore population of uniform size around the 4-10 nm range.

Concerning the mesostructured matrix, the difference between the value of the pore diameter $\phi$ and the cell parameter a defined by small-angle XRD as described above allows to have access to quantity e where $e=a-\phi$ and it is characteristic of the thickness of the amorphous walls of the mesostructured matrix making up each spherical particle of the material according to the invention. Said cell parameter a is related to the correlation distance d between pores by a geometrical factor characteristic of the geometry of the phase, For example, in the case of a hexagonal cell $e-a-\phi$ with $a=2*d/\sqrt{3}$, in the case of a vermicular structure $e=d-\phi$.

Transmission electron microscopy (TEM) analysis is also a commonly used technique for characterizing the structure of these materials. If allows formation of an image of the solid studied, the contrasts observed being characteristic of the structural organization, the texture or the morphology of the particles observed, the resolution of the technique reaching 0.2 nm maximum. In the description hereafter, the TEM photos are obtained from michrotome sections of the sample in order to visualize a section of an elementary spherical particle of the material according to the invention. For example, the TEM images obtained far a mesastructured aluminasilicate material according to the invention, obtained according to one of the six preparation methods of the invention, using the particular black copolymer Pluranic 123, exhibit spherical elementary particles having a vermicular mesastructure, the matter being defined by the dark zones. Analysis of the image also allows to have access to parameters d, $\square$ and e, characteristic of the mesastructured matrix, defined above. By way of example of a mesastructured/zealitic mixed material the TEM images obtained far such a material obtained according to one at the six preparation methods of the invention, comprising zealite nanocrystals of ZSM-5 (MFI) type, the mesostructured matrix being of aluminasilicate nature and obtained using the particular black copolymer P123, exhibit within a single spherical particle a vermicular structure (the matter being defined by dark zanes) within which are visualized mare or less spherical opaque objects representing the zealite nanocrystals trapped in the mesastructured matrix. Analysis of the image also allows to have access to parameters d, $\phi$ and e, characteristic of the mesostructured matrix, defined above. It is also possible to visualize in this image the reticular planes at the nanocrystals instead of the aforementioned opaque objects, and thus to go back to the structure of the zeolite.

The morphology and the size distribution of the elementary particles were established by analysis of photos obtained by scanning electron microscapy (SEM).

The structure of the mesastructured matrix making up each particle of the material according to the invention can be cubic, vermicular, cholesteric, lamellar, bicontinuous or hexagonal, depending on the nature of the surfactant selected as the structuring agent. The structure is preferably vermicular.

The present invention relates to the use of the mesostructured material according to the invention as an adsorbent for pollution control or as a molecular sieve far separation. The object of the present invention thus also is an adsorbent comprising the mesostructured material according to the invention. It is also advantageously used as an acidic solid for catalysing reactions, for example those taking place in the spheres of refining and petrachemistry.

When the mesostructured material according to the invention is used as a catalyst, this material can be associated with an inorganic matrix that may be inert or catalytically active and with a metallic phase. The inorganic matrix can be present simply as a binder far holding together the particles of said material in the various farms known for catalysts (extrudates, pellets, balls, powders), or it can be added as a diluent far imposing the conversion degree in a process that would otherwise progress too fast, leading to catalyst fouling due to the formation of a significant proportion of coke. Typical inorganic matrices are notably support materials for catalysts, such as the various forms of silica, alumina, silica-alumina, magnesia, zirconia, titanium, boron oxides, aluminium, titanium, zirconium phosphates, clays such as kaolin, bentonite, montmorillonite, sepiolite, attapulgite, fuller's earth, synthetic porous materials such as $SiO_2$-$Al_2O_3$, $SiO_2$-$ZrO_2$, $SiO_2$-$ThO_2$, $SiO_2$-BeO, $SiO_2$-$TiO_2$, or any combination of these compounds. The inorganic matrix can be a mixture of various compounds, in particular of an inert phase and of an active phase. Said material of the present invention can also be associated with at least one zeolite and act as the main active phase or as an a additive. The metallic phase can be introduced fully on said material of the invention. It can also be introduced fully on the inorganic matrix or on the inorganic matrix-mesostructured solid assembly, through ion exchange or impregnation with cations or oxides selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir, and any other element from the periodic table.

The catalytic compositions comprising the material of the present invention are generally suited for implementation of the main hydrocarbon conversion processes and organic compound synthesis reactions.

The catalytic compositions comprising the material of the invention advantageously find their application in the following reactions: isomerization, transalkylation and dismutation, alkylation and dealkylation, hydration and dehydration, oligomerization and polymerization, cyclization, aromatization, cracking, reforming, hydrogenation and dehydrogenation, oxidation, halogenation, hydrocracking, hydroconversion, hydrotreatment, hydrodesulfurization and hydrodenitrogenation, catalytic elimination of nitrogen oxides, said reactions involving feeds comprising saturated and unsaturated aliphatic hydrocarbons, aromatic hydrocarbons, oxygen-containing organic compounds and organic compounds containing nitrogen and/or sulfur, as well as organic compounds containing other functional groups.

The invention is illustrated by the following examples.

EXAMPLE 1 (invention)

Preparation of a mesostructured aluminosilicate material having a high aluminium content, of Si/Al molar ratio=0.5, obtained according to the main preparation method of the invention 3.4 kg hexahydrated aluminium trichloride is added to a solution containing 10 kg ethanol, 5 l water, 36 ml HCl and 1.3 kg surfactant CTAB. The assembly is left under stirring at ambient temperature until complete dissolution of the aluminic precursor. 1.4 kg tetraethylorthosilicate (TEOS) are then added. After 10-mm stirring at ambient temperature, the assembly is atomized by means of a "mono-fluid" spray nozzle in a chamber into which a carrier gas, a dry air/nitrogen mixture, is sent. The droplets obtained by atomization are dried at 100° C. according to the protocol described in the above description of the invention, in accordance with stage c) of the main preparation method of the invention. The particles are collected in a bag filter. Said particles are crushed by means of a jet mill and brought down to some μm (3 to 5 μm). A 30 wt. % fraction of these crushed particles is then fed again info a solution having the same formulation as the initial solution, then the suspension is atomized again by means of a "mono-fluid" nozzle, as above, and the droplets dried at 100° C. according to the protocol described in the description of the invention above according to stage g) of the main preparation method of the invention. The powder collected in a bag filter is then calcined in air for 5 hours at T=550° C. in order to remove the surfactant (CTAB). The volume percentage of non-volatile compounds present in the suspension prior to the second atomization is 8.4%. The solid is characterized by small-angle XRD, nitrogen volumetric analysis, TEM, SEM and ICR The TEM analysis shows that the final material has an organized mesoporosity characterized by a vermicular structure. Nitrogen volumetric analysis leads to a specific surface area of the final material SBET=510 $m^2$/g and to a mesopore diameter $\phi$=2.5 nm. The small-angle XRD analysis leads to the visualization of a correlation peak at angle 2θ2.2. The Bragg relation gives 2 d*sin (1.1)=1.5406 allows to calculate the correlation distance d between the pores of the mesostructured matrix, i.e. d=4.0 nm. The thickness of the walls of the mesostructured material defined by e=d−$\phi$ thus is e=1.5 nm. ICP analysis gives a Si/Al molar ratio=0.5. A SEM image of the spherical elementary particles thus obtained shows that these particles have a size characterized by a diameter ranging between 15 and 100 μm, the size distribution of these particles being around 50 μm.

EXAMPLE 2 (invention)

Preparation of a mesostructured aluminosilicate material having a high aluminium content, of Si/Al molar ratio=0.9, obtained according to the main preparation method of the invention 2.6 kg hexahydrated aluminium trichloride are added to a solution containing 11 kg ethanol, 5 l water, 36 ml HCl and 1.4 kg surfactant P123. The assembly is left under stirring at ambient temperature until complete dissolution of the aluminic precursor. 2 kg tetraethylorthosilicate (TEOS) are then added. After 18-hour stirring at ambient temperature, the assembly is atomized by means of a "mono-fluid" spray nozzle in a chamber into which a carrier gas, a dry air/nitrogen mixture, is sent. The droplets obtained by atomization are dried at 100° C. according to the protocol described in the above description of the invention, in accordance with stage c) of the main preparation method of the invention. The particles are collected in a bag filter. Said particles are crushed by means of a jet mill and brought down to some μm (3 to 5 μm). A 30 wt. % fraction of these crushed particles is then fed again into a solution having the same formulation as the initial solution, then the suspension is atomized again by means of a "mono-fluid" nozzle, as above, and the droplets dried at 100° C. according to the protocol described in the description of the invention above according to stage g) of the main method of the invention. The powder collected in a bag filter is then calcined in air for 5 hours at T=550° C. in order to remove the surfactant (P123). The volume percentage of non-volatile compounds present in the suspension prior to the second atomization is 9.8%. The solid is characterized by small-angle XRD, nitrogen volumetric analysis, TEM, SEM and ICP. The TEM analysis shows that the final material has an organized mesoporosity characterized by a vermicular structure. Nitrogen volumetric analysis leads to a specific surface area of the final material $S_{BET}$=280 $m^2$/g and to a mesopore diameter $\phi$=5.6 nm. The small-angle XRD analysis leads to the visualization of a correlation peak at angle 2θ=0.64. The Bragg relation gives 2 d*sin (0.32)=1.5406 allows to calculate the correlation distance d between the pores of the mesostructured matrix, i.e. d=13.1 nm. The thickness of the walls of the mesostructured material defined by e=d−$\phi$ thus is e=7.5 nm. ICP analysis gives a Si/Al molar ratio=0.9. A SEM image of the spherical elementary particles thus obtained shows that these particles have a size characterized by a diameter ranging between 15 and 100 μm, the size distribution of these particles being around 50 μm.

EXAMPLE 3 (invention)

Preparation of a mesostructured aluminosilicate material having a high aluminium content, comprising zeolite nanocrystals of ZSM-5 (MFI) type (Si/Al molar ratio=100, 10 wt. % of the final material) trapped in a mesostructured aluminosilicate matrix (Si/Al molar ratio=0.9), obtained with the first main method of preparing the mesostructured/zeolitic mixed material according to the invention 140 g aluminium tri-sec-butoxide are added to a solution containing 3.5 l tetrapropylammonium hydroxide (TPAOH), 10 g soda NaCH and 4.3 l water. After dissolution of the aluminium alkoxide, 6 kg tetraethylorthosilicate (TEOS) are added. The solution is stirred at ambient temperature for 5 h, then autoclaved at T=95° C. for 12 h. The white solution obtained contains 135-nm ZSM-5 nanocrystals. This solution is centrifuged at 20,000 rpm for 30 minutes. The solid is redispersed in water, then centrifuged again at 20,000 rpm for 30 minutes. This washing cycle is carried out twice. The nanocrystals form a gel that is dried in the stove for one night at 60° C. 460 mg of these crystals ore redispersed in a solution containing 11 kg ethanol, 5 l water, 2 kg TEOS, 2.6 kg $AlCl_3$, $6H_2O$, 36 ml HCl and 1.4 kg surfactant P123 by ultrasonic stirring for 24 hours. The assembly is atomized by means of a "mono-fluid" spray nozzle in a chamber into which a carrier gas, a dry air/nitrogen mixture, is sent. The droplets obtained by atomization are dried at 100° C. according to the protocol described in the above description of the invention, in accordance with stage c') of the first main preparation method of the invention. The particles are collected in a bag filter. Said particles are crushed by means of a jet mill and brought down to some pm (3 to 5 μm). A 30 wt. % fraction of these crushed particles is then fed again info a solution having the same formulation as the initial solution, then the suspension is atomized again by means of a "mono-fluid" nozzle, as above, and the droplets dried at 100° C. according to the protocol described in the description of the invention above according to stage g') of the first main preparation method of the invention. The powder collected in a bag filter is then calcined in air for 5 hours at T 550° C. in order to remove the surfactant (P123). The volume percentage of non-volatile compounds present in the suspension prior to the second atomization is 9.8%. The solid is characterized by small-angle XRD, nitrogen volumetric analysis, TEM, SEM and ICP. The TEM analysis shows that the final material consists of ZSM-5 zeolite nanocrystals trapped in an aluminosilicate matrix of organized mesoporosity characterized by a vermicular structure. Nitrogen volumetric analysis leads to a specific surface area of the final material SBET=310 $m^2/g$ and to a mesopore diameter characteristic of the aluminosilicate mesostructured matrix=5.6 nm. The wide-angle XRD analysis leads to the diffractogram characteristic of the ZSM-5 zeolite (micropore size of the order of 0.55 nm). The small-angle XRD analysis leads to the visualization of a correlation peak associated with the vermicular symmetry of the mesostructured matrix. The Bragg relation gives 2 d*sin (0.32)=1.5406, i.e. d=13.1 nm. The thickness of the amorphous walls of the mesostructured aluminosilicate matrix defined by e=d−φ thus is e=7.5 nm. The ICP analysis gives a Si/Al molar ratio of the matrix=0.9. A SEM image of the spherical elementary particles thus obtained shows that these particles have a size characterized by a diameter ranging between 15 and 100 μm, the size distribution of these particles being around 50 μm.

The invention claimed is:

1. A mesostructured material consisting essentially of at least two elementary spherical particles, each of said spherical particles comprising a mesostructured matrix based on aluminum oxide, said matrix having a pore diameter ranging between 1.5 and 30 nm, and an aluminum oxide content representing more than 46 wt. % of the mass of said matrix such that said mesostructured matrix has a Si/Al molar ratio strictly below 1, said matrix having amorphous walls of thickness ranging between 1 and 30 nm, and said elementary spherical particles having a diameter D ranging between 11 and 70 μm.

2. A material as claimed in claim 1, such that said spherical particles have a diameter D ranging between 11 and 50 μm.

3. A material as claimed in claim 2, such that said spherical particles have a diameter D ranging between 15 and 50 μm.

4. A material as claimed in claim 1, such that said mesostructured matrix based on aluminum oxide comprises silicon oxide.

5. A material as claimed in claim 1, such that said mesostructured matrix has a cubic, vermicular, cholesteric, lamellar, bicontinuous or hexagonal structure.

6. A material as claimed in claim 1, having a specific surface area ranging between 100 and 1200 $m^2/g$.

7. A material as claimed in claim 1, such that each of said spherical particles comprises zeolite nanocrystals having a pore opening ranging between 0.2 and 2 nm.

8. A material as claimed in claim 7, wherein said zeolite nanocrystals comprise at least one zeolite selected from among the zeolites of MFI, BEA, FAU and LTA structural type.

9. A material as claimed in claim 7, wherein said zeolite nanocrystals comprise at least one entirely silicic zeolite.

10. A material as claimed in claim 7, wherein said zeolite nanocrystals comprise at least one zeolite containing silicon and aluminum.

11. A method of preparing a mesostructured material according to claim 1, comprising: a) mixing into a solution at least one surfactant, at least one aluminic precursor and optionally at least one silicic precursor; b) aerosol atomizing the solution obtained in stage a) using a spray nozzle that leads to the formation of liquid droplets of diameter less than or equal to 300 μm; c) drying said droplets; d) crushing the solid product obtained in stage c); e) mixing into a solution at least one surfactant, at least one aluminic precursor, optionally at least one silicic precursor and at least a fraction of the solid product obtained in stage d) so as to form a suspension such that the volume percentage of non-volatile compounds present in the suspension is at least 7%; f) aerosol atomizing the suspension obtained in stage e) using a spray nozzle that leads to the formation of suspension droplets, which are precursors of the constituent spherical elementary particles of diameter D ranging between 11 and 70 μm; g) drying said droplets obtained in stage f); and h) removing said surfactant introduced in said stages a) and e) so as to obtain a mesostructured porosity material, wherein the amounts of aluminic precursor and silicic precursor in stages a) and e) are provided such that the resulting mesostructured matrix has a Si/Al molar ratio strictly below 1.

12. A method of preparing a mesostructured material according to claim 7, comprising: $a_o$) synthesizing, in the presence of at least one structuring agent, zeolite nanocrystals of maximum nanometric size equal to 1000 nm so as to obtain a colloidal solution in which said nanocrystals are dispersed; a') mixing into a solution at least one surfactant, at least one aluminic precursor, optionally at least one silicic precursor and at least a colloidal solution obtained according to $a_o$); b') aerosol atomizing the solution obtained in stage a') using a spray nozzle that leads to the formation of liquid droplets of diameter less than or equal to 300 μm; c') drying said droplets; d') crushing the solid product obtained in stage c'); e') mixing into a solution at least one surfactant, at least one aluminic precursor, optionally at least one silicic precursor, at least a colloidal solution obtained according to $a_o$) and at least a fraction of the solid product obtained in stage d') so as to form a suspension, such that the volume percentage of non-volatile compounds present in said suspension is at least 7%; f') aerosol atomizing the suspension obtained in stage e') using a spray nozzle that leads to the formation of suspension droplets, which are precursors of the constituent spherical elementary particles of diameter D ranging between 11 and 70 μm; g') drying said droplets obtained in stage f'); and h') removing said surfactant introduced in stages a') and e') so as to obtain a mesostructured/zeolitic mixed material, wherein the amounts of aluminic precursor and silicic precursor in stages a') and e') are provided such that the resulting mesostructured matrix has a Si/Al molar ratio strictly below 1.

13. A method of preparing a mesostructured material according to claim 7, comprising: a") mixing into a solution at least one surfactant, at least one aluminic precursor, optionally at least one silicic precursor and zeolite crystals that disperse in form of nanocrystals of maximum nanometric size equal to 1000 nm in said solution; b") aerosol atomizing the solution obtained in stage a") using a spray nozzle that leads to the formation of liquid droplets of diameter less than or equal to 300 μm; c") drying said droplets; d") crushing the solid product obtained in stage c"); e") mixing into a solution at least one surfactant, at least one aluminic precursor, optionally at least one silicic precursor, zeolite crystals that disperse in form of nanocrystals of maximum nanometric size equal to 1000 nm in said solution and at least a fraction of the solid product obtained in stage d") so as to form a suspension, such that the volume percentage of non-volatile compounds present in said suspension is at least 7%; f") aerosol atomizing the suspension obtained in stage e") using a spray nozzle that leads to the formation of suspension droplets, which are precursors of the constituent spherical elementary particles of diameter D ranging between 11 and 70 μm; g") drying said droplets obtained in stage f"); and h") removing said surfactant introduced in stages a") and e") so as to obtain a mesostructured/zeolitic mixed material, wherein the amounts of aluminic precursor and silicic precursor in stages a") and e") are provided such that the resulting mesostructured matrix has a Si/Al molar ratio strictly below 1.

* * * * *

UNITED STATES PATENT AND TRADEMARK OFFICE
CERTIFICATE OF CORRECTION

PATENT NO.       : 8,568,882 B2                                                    Page 1 of 1
APPLICATION NO.  : 12/935334
DATED            : October 29, 2013
INVENTOR(S)      : Chaumonnot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this
Fifteenth Day of September, 2015

Michelle K. Lee
*Director of the United States Patent and Trademark Office*